United States Patent
Yoshiyama

(10) Patent No.: US 6,545,578 B2
(45) Date of Patent: Apr. 8, 2003

(54) CENTERING MAGNET FOR DEFLECTION YOKES AND PROCESS FOR PRODUCING SAME

(75) Inventor: Shinji Yoshiyama, Hirakata (JP)

(73) Assignees: Sanyo Electric Co., Ltd., Moriguchi (JP); Sanyo Electronic Components Co., Ltd., Daito (JP)

(*) Notice: Subject to any disclaimer, the term of this patent is extended or adjusted under 35 U.S.C. 154(b) by 34 days.

(21) Appl. No.: 09/940,458

(22) Filed: Aug. 29, 2001

(65) Prior Publication Data

US 2002/0030571 A1 Mar. 14, 2002

(30) Foreign Application Priority Data

Sep. 1, 2000 (JP) .......................... 2000-266192

(51) Int. Cl.$^7$ .............. H01F 7/00; H01F 7/02; H01J 29/54
(52) U.S. Cl. ............. 335/212; 335/302; 335/303; 264/328.8; 264/429
(58) Field of Search ............... 335/210–214, 335/284, 302–306; 264/429, 478, 108, 328.1, 328.2, 328.3, 328.8

(56) References Cited

U.S. PATENT DOCUMENTS 4,327,346 A * 4/1982 Tada et al. .................. 335/296

* cited by examiner

*Primary Examiner*—Ramon M. Barrera
(74) *Attorney, Agent, or Firm*—Armstrong, Westerman & Hattori, LLP

(57) ABSTRACT

The invention provides a deflection yoke having two centering magnets mounted thereon for the adjustment of centering. Each of the centering magnets is molded in an annular form from a resin material containing a finely divided magnetic material, the centering magnet having two portions opposed to each other as displaced from each other by 180 degrees about a center axis of the annular form thereof and magnetized to an N pole and an S pole respectively, the content of the magnetic material varying circumferentially of the annular form, the distribution of the content being symmetrical about a straight line orthogonal to a straight line through a center point of the N pole and a center point of the S pole. The magnetic force for the adjustment of centering can be eliminated by the two magnets mounted in combination.

6 Claims, 9 Drawing Sheets

CENTERING MAGNET FOR DEFLECTION YOKES AND PROCESS FOR PRODUCING SAME

FIELD OF THE INVENTION

The present invention relates to deflection yokes for deflecting the electron beam to be emitted by a cathode-ray tube.

BACKGROUND OF THE INVENTION

With reference to FIGS. 10(*a*) and 10(*b*), two annular centering magnets 7, 7 are mounted on a deflection yoke 6 at its neck end. The centering of an electron beam can be adjusted by rotatingly moving the magnets 7, 7.

The centering magnet 7 is molded in an annular form as shown in FIG. 11 from a resin containing a finely divided magnetic material mixed therewith (hereafter referred to as the "magnetic resin"). The magnet is magnetized to an N pole 73 and an S pole 74 at two portions which are displaced from each other by 180 degrees about the center axis of the annular form to serve as a two-pole magnet. The centering magnet 7 has a pair of adjusting knobs 70, 71 projecting from the two portions where the N pole 73 and the S pole 74 are provided. The annular form of the centering magnet 7 is symmetrical about an extension (line E—E) of a diametrical line connecting the center point 75 of the N pole 73 to the center point 76 of the S pole 74, and is also symmetrical about an extension (line F—F) of a diametrical line orthogonal to the line E—E.

Examples of useful finely divided magnetic materials are those of the alnico (Al—Ni—Co) type, ferrite type or rare-earth elements. Finely divided alnico magnetic materials are widely used from the viewpoint of magnetic intensity, temperature characteristics, cost and productivity.

However, the conventional centering magnet 7 prepared from a magnetic resin containing a finely divided alnico magnetic material mixed therewith has the problem that the images displayed on a picture tube of electron beam are low in resolution because of an uneven distribution of the finely divided magnetic material. FIG. 12 shows the distribution of finely divided magnetic material in the centering magnet 7. The content of the magnetic material 31 is greater toward the N pole 73 and decreases toward the S pole 74 presumably because the finely divided alnico magnetic material is greater than ferrite magnetic materials in particle size.

In the molding step wherein the magnetic resin is used, the magnetic resin is poured into a mold 8 having an annular hollow portion 80 through a resin gate opening 81 thereof as shown in FIG. 13 and then divided into two resin streams along the annular form of the hollow portion 80. The divided streams thereafter flow together. Consequently, the content of the finely divided magnetic material is small toward the resin gate opening 81 and increases at a confluent portion 79 shown in FIG. 12 where the two resin streams meet, with the result that uneven magnetization occurs in the centering magnet 7 having the N pole 73 and the S pole 74 formed by magnetization, between the S pole (74) side having a small magnetic material content and the N pole (73) side with a great magnetic material content.

FIG. 14 shows a distribution of lines of magnetic force produced across the central aperture 78 of each of centering magnets 7, 7 which are arranged in a pair as positioned in opposite relationship in polarity. As illustrated, lines of magnetic force emanating from the N pole 73 toward the S pole 74 are arranged concentrically on the N pole (73) side of high magnetic material content and dispersed on the S pole (74) side of low magnetic material content, thus spreading out from the N pole 73 toward the S pole 74. Accordingly, the point of change of polarity from the N pole 73 to the S pole 74 on the centering magnet 7 is positioned closer to the N pole 73 than the line F—F, resulting in a difference between the distance from the N pole 73 to the point of polarity change and the distance from the S pole 74 to the point. When the two centering magnets 7, 7 are superposed on each other as positioned in opposite relationship in polarity, the lines of magnetic force emanating from one of the magnets 7, 7 will consequently intersect those from the other magnet as seen in FIG. 15.

FIG. 15 shows that the two centering magnets 7, 7 are positioned at an angle of zero relative to each other. When the relative angle is altered from this position, the lines of magnetic forces of the two magnets 7, 7 combine, and the combined lines of magnetic force exert on the electron beam a magnetic force for the adjustment of centering (adjusting magnetic force). Even if the two centering magnets 7, 7 are set in the position of relative angle of zero as shown in FIG. 15 in the case where no adjustment is needed for centering, the distribution of the lines of magnetic forces of the magnets 7, 7 is not symmetrical about the line F—F, and the magnets 7, 7 therefore fail to offset each other in magnetic lines. As a result, the combined magnetic lines set up a four-pole residual magnetic field over the central apertures 78, 78 of the two magnets 7, 7 as indicated by allows in FIG. 16.

Accordingly, the electron beam 9 having a circular cross section and passing through the central apertures 78, 78 of the magnets 7, 7 is expanded in one direction and contracted in other direction orthogonal to the direction by being magnetically acted on by the four-pole residual magnetic field to deform to an elliptical form in cross section. This impairs the performance of image focusing on the screen of the picture tube of electron beam to form images of low resolution.

SUMMARY OF THE INVENTION

An object of the present invention is to provide a centering magnet adapted to eliminate the adjusting magnetic force when there is no need for centering adjustment, a deflection yoke provided with such centering magnets, and a process for producing the centering magnet.

The present invention provides a first centering magnet which is molded in an annular form from a magnetic resin, the centering magnet having two portions opposed to each other as displaced from each other by 180 degrees about a center axis of the annular form thereof and magnetized to an N pole and an S pole respectively, the content of finely divided magnetic material varying circumferentially of the annular form, the distribution of the content being symmetrical about a straight line (line B—B) orthogonal to a straight line (line A—A) through a center point of the N pole and a center point of the S pole.

The invention provides a first deflection yoke having two first centering magnets mounted thereon in combination.

The distribution of the content of the finely divided magnetic material in the first centering magnet of the invention is symmetrical about the line B—B, so that the distribution of the lines of magnetic force emanating from the N pole toward the S pole is similarly symmetrical about the line B—B.

With the first deflection yoke of the invention, the distribution of the lines of magnetic force emanating from the N pole toward the S pole in each centering magnet is symmetrical about the line B—B, so that when the two centering magnets are superposed on each other as positioned in opposite relationship in polarity, the lines of magnetic forces emanating from one of the two magnets offset those of the other magnet, setting up no four-pole residual magnetic field due to the combination of magnetic lines. This eliminates the magnetic force for the adjustment of centering.

The present invention further provides a second centering magnet molded in an annular form from a magnetic resin, with a plurality of positions arranged symmetrically about a diametrical line of the annular form and each serving as the most upstream position for a flow of the resin for molding, the centering magnet being magnetized to an N pole and an S pole respectively at two portions intersecting the diametrical line or at two portions 90 degrees out of phase with the two portions respectively.

The invention provides a second deflection yoke having two second centering magnets mounted thereon in combination.

The plurality of positions symmetrical about a diametrical line of the annular form each serve as the most upstream position for the flow of the resin for molding the second centering magnet of the invention, so that the distribution of the content of finely divided magnetic material is symmetrical about the diametrical line. In the case where the two portions on the diametrical line are magnetized to the N pole and the S pole respectively, the distribution of the content of magnetic material is symmetrical about a line (line B—B) orthogonal to the line through the center point of the N pole and the center point of the S pole. Accordingly, the distribution of the lines of magnetic force emanating from the N pole toward the S pole also becomes symmetrical about the line B—B. Similarly when two portions 90 degrees out of phase with the above-mentioned two portions are magnetized to the N pole and S pole respectively, the distribution of the content of magnetic material is symmetrical about a line (line B—B) orthogonal to the line through the center point of the N pole and the center point of the S pole. Accordingly, the distribution of the lines of magnetic force emanating from the N pole toward the S pole also becomes symmetrical about the line B—B.

In the case of the second deflection yoke of the invention as with the first deflection yoke, the distribution of the lines of magnetic force emanating from the N pole toward the S pole in each centering magnet is symmetrical about the line B—B, so that the magnetic force for the adjustment of centering can be eliminated by superposing the two centering magnets on each other as positioned in opposite relationship in polarity.

The finely divided magnetic material for use in the specific devices described contains an alnico magnetic material. The centering magnet then becomes superior to centering magnets wherein ferrite or rare-earth element magnetic material is used, in the intensity of magnetic force, temperature characteristics, cost and productivity.

The present invention provides a process for producing the centering magnet of the invention. The process has the resin molding step of molding an annular magnetic body from a magnetic resin, and the step of magnetizing the magnetic body molded by the step. Used in the resin molding step is a mold having a plurality of resin gate openings in corresponding relation with a plurality of positions symmetrical about a diametrical line of the annular form of the magnetic body to be molded. The magnetic resin is poured into the mold through the resin gate openings. The magnetizing step magnetizes the magnetic body molded by the resin molding step to an N pole and an S pole respectively at two portions thereof intersecting the diametrical line or at two portions thereof 90 degrees out of phase with the respective two portions.

According to the process described, the magnetic resin is poured into the mold first in the molding step through the resin gate openings formed in the mold, whereby the resin is divided into two streams in the vicinity of each gate opening. The two resin streams thereafter meet to form an annular magnetic body. Consequently, the magnetic body is lowest in the content of finely divided magnetic material at the most upstream position for the resin stream for molding, and is highest in the content at the confluent position. The distribution of content of the finely divided magnetic material therefore becomes symmetrical about the diametrical line.

When the two portions of the magnetic body intersecting the diametrical line are thereafter magnetized to the N pole and S pole, respectively, by the magnetizing step, the distribution of content of finely divided magnetic material becomes symmetrical about a straight line (line B—B) orthogonal to a straight line through the center point of the N pole and the center point of S pole, so that the distribution of lines of magnetic force emanating from the N pole toward the S pole also becomes symmetrical about the line B—B. Similarly when the magnetic body is magnetized at two portions 90 degrees out of phase with the respective two portions, the distribution of content of magnetic material becomes also symmetrical about the straight line (line B—B) orthogonal to the straight line through the center point of the N pole and the center point of S pole. The distribution of lines of magnetic force emanating from the N pole toward the S pole therefore becomes also symmetrical about the line B—B.

With the deflection yoke provided with a pair of centering magnets of the present invention, the adjusting magnetic force of the magnets can be eliminated completely when the centering adjustment need not be made.

DETAILED DESCRIPTION OF EMBODIMENTS

Embodiments of the invention will be described below in detail with reference to the drawings concerned.

First Embodiment

Figure 1:
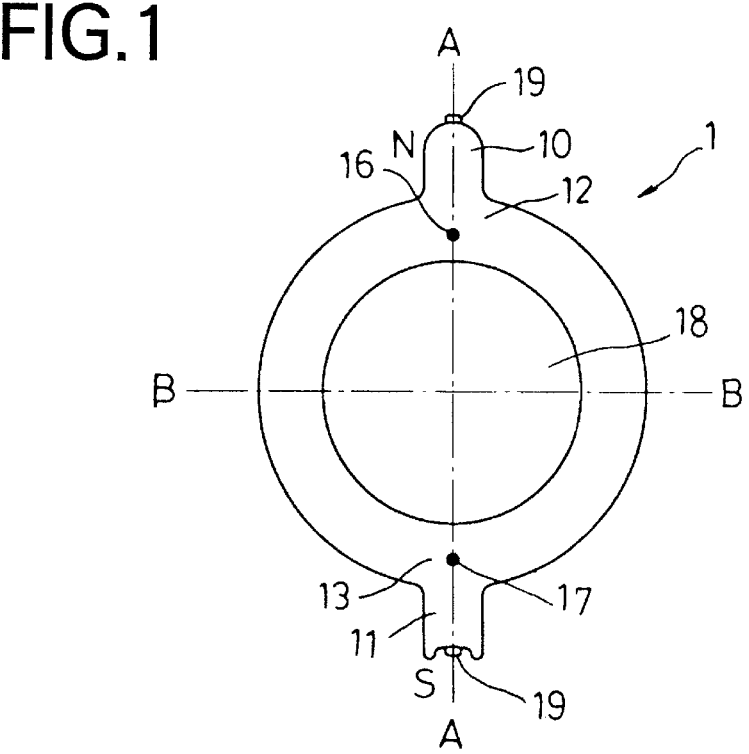
FIG. 1 is a plan view of a centering magnet of the invention.

With reference to FIG. 1, the centering magnet 1 of this embodiment is molded in an annular form having a central aperture 18 from a nylon resin containing a finely divided alnico magnetic material (hereinafter referred to as a "magnetic resin"), and has two portions displaced from each other by 180 degrees about the center axis of the annular form and magnetized to an N pole 12 and an S pole 13, respectively. The centering magnet 1 has a pair of adjusting knob portions 10, 11 projecting outward from the two portions having the N pole 12 and the S pole 13. A pair of resin gate openings 19, 19 are formed in the outer ends of the knob portions 10, 11.

The annular form of the centering magnet 1 is symmetrical about an extension (line A—A) of a diametrical line connecting the center point 16 of the N pole 12 to the center point 17 of the S pole 13, and also symmetrical about an extension (line B—B) of a diametrical line orthogonal to the line A—A.

Figure 2:
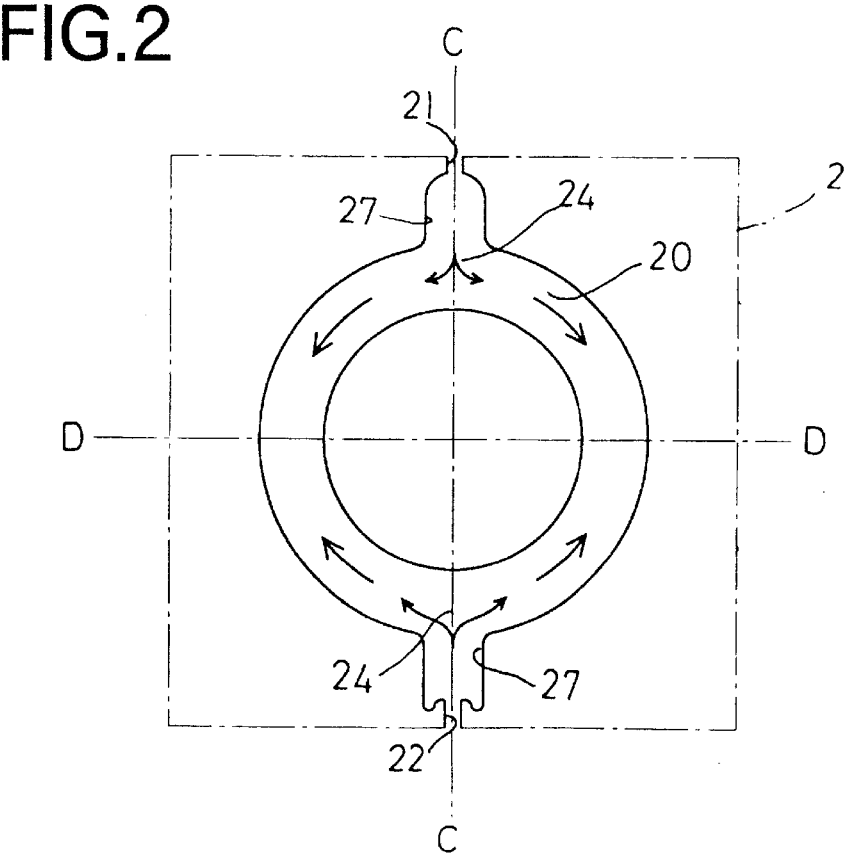
FIG. 2 is a plan view showing the shape of a hollow portion of a mold for use in molding the centering magnet.

To produce the centering magnet 1, a mold 2 is prepared first which has an annular hollow portion 20 shaped in conformity with the contour of the centering magnet as seen in FIG. 2. The magnetic resin is poured into the hollow portion 20 to mold an annular magnetic body. The hollow portion 20 of the mold 2 has a pair of cavities 27, 27 at positions displaced from each other by 180 degrees about the center axis of the annular form thereof for forming the pair of adjusting knob portions. The cavities 27, 27 have respective resin gate openings 21, 22 for pouring the magnetic resin into the hollow portion 20 therethrough.

Incidentally, the annular form of hollow portion 20 of the mold 2 is symmetric about a line C—C through the centers of the cavities 27, 27 and is also symmetric about a line D—D orthogonal to the line C—C.

The magnetic resin is poured into the hollow portion 20 of the mold 2 through the resin gate openings 21, 22 of the mold in the molding step. The resin poured in through the gate openings 21, 22 is divided on the line C—C as indicated by arrows in FIG. 2, forming four streams of magnetic resin (hereinafter referred to as "resin streams"). These four resin streams are symmetric about the line C—C and also symmetric about the line D—D. On each side of the line C—C, two resin streams meet on the line D—D, filling up the hollow portion 20 with the magnetic resin.

The magnetic body thus obtained is smallest in the content of finely divided magnetic material at the position where the magnetic resin poured in through each of the resin gate openings 21, 22 of the mold 2 is divided, i.e., at each of the most upstream positions 24, 24 of the resin streams. The magnetic body is greatest in the content of magnetic material at each of the confluent positions.

Figure 3:
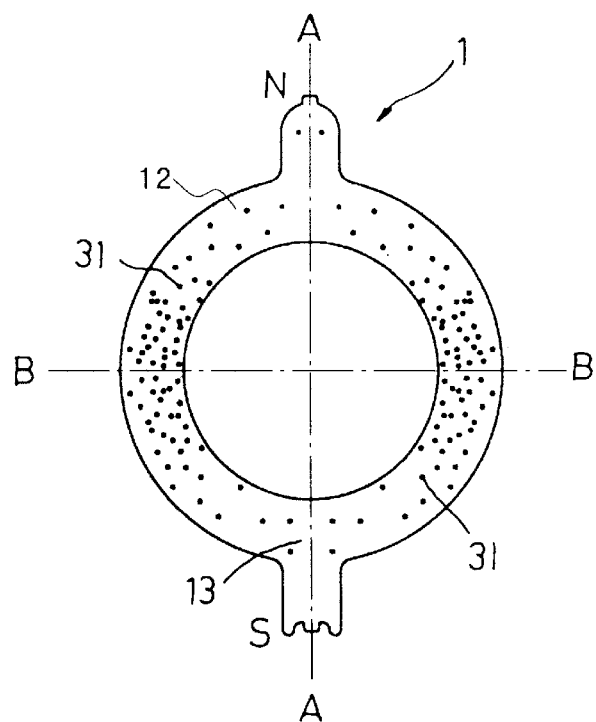
FIG. 3 is a plan view showing the distribution of a finely divided magnetic material incorporated into the centering magnet.

FIG. 3 shows the distribution of the finely divided magnetic material 31 in the magnetic body. As previously stated, the four resin streams formed for resin molding are symmetrical about the line C—C and about the line D—D shown in FIG. 2, so that the distribution of the finely divided magnetic material 31 is also symmetrical about the line C—C and about the line D—D. Thus as shown in FIG. 3, the content of the finely divided magnetic material gradually varies from the two positions on the line B—B where the content is greatest toward the two positions on the line A—A where the content is smallest.

Subsequently, the magnetic body obtained by the molding step is magnetized. The body is magnetized by this step so that one adjusting knob portion 10 of the centering magnet 1 provides an N pole 12, with the other adjusting knob portion 11 forming an S pole 13 as shown in FIG. 1. Since the distribution of the finely divided magnetic material 31 is symmetrical about the line B—B orthogonal to the line A—A through the center point of the N pole 12 and the center point of the S pole as shown in FIG. 3, there is no likelihood that the N pole (12) side will be different from the S pole (13) side in the mode of magnetization.

Figure 4:
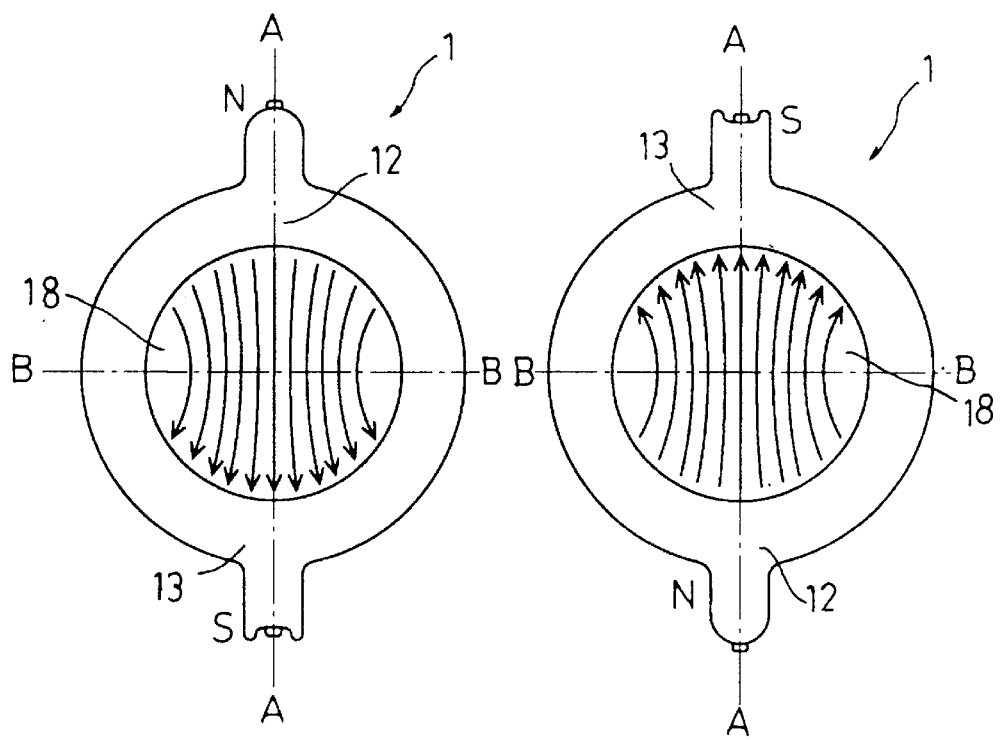
FIG. 4 is a plan view of two centering magnets of the invention as arranged side by side to show the distribution of lines of magnetic force emanating from each magnet.

FIG. 4 shows a pair of centering magnets 1, 1 which are arranged side by side in an opposite relationship in polarity to illustrate the distribution of lines of magnetic force produced over the central aperture 18 of each magnet. Since the N pole (12) side of the centering magnet 1 is not different from the S pole (13) side thereof in the mode of magnetization as described above, the N pole (12) side is equal to the S pole (13) side in the density of lines of magnetic force emanating from the N pole 12 toward the S pole 13, and the distribution of magnetic lines is symmetrical about the line B—B.

Figure 5:
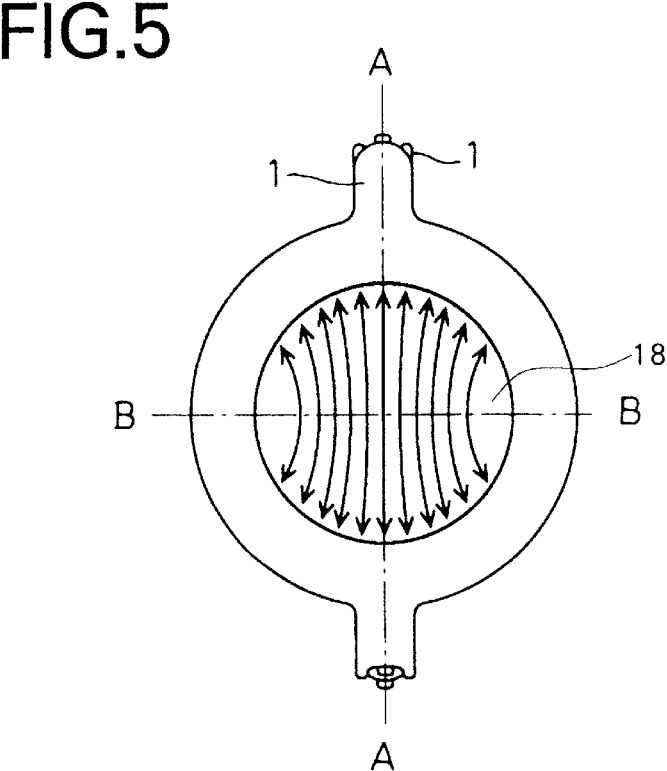
FIG. 5 is a plan view of the two centering magnets to show superposed lines of magnetic forces emanating therefrom.

Consequently, the point of change of polarity on the centering magnet 1 where the polarity changes from N pole to S pole is positioned on the line B—B, and the distance from the N pole 12 to the point is equal to the distance from the S pole 13 to the point. Accordingly, when the two centering magnets 1, 1 as positioned in FIG. 4 are superposed on each other, the lines of magnetic force emanating from one of the magnets 1, 1 become superposed on those of the other magnet as shown in FIG. 5 without intersection, and the points of change of polarity of the two magnets 1, 1 are positioned on the line B—B.

Figure 6:
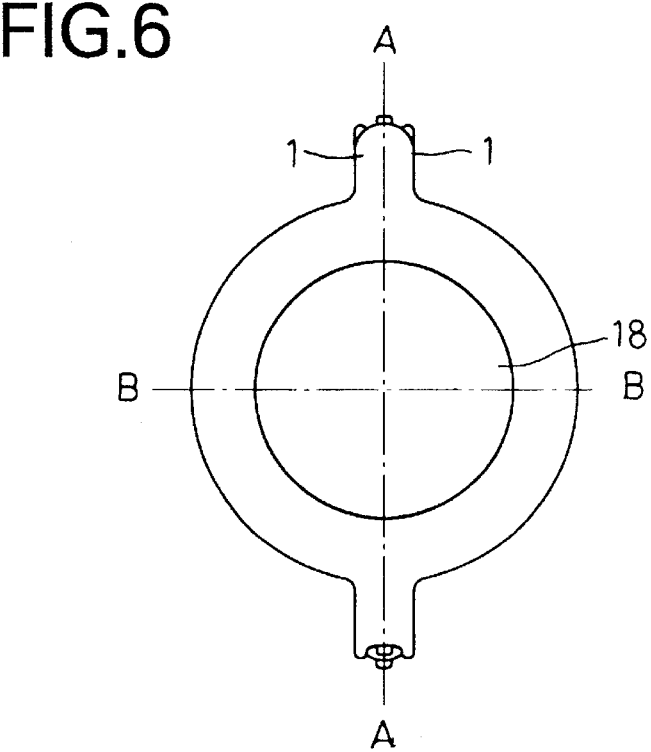
FIG. 6 is a plan view of the two centering magnets to show their combined lines of magnetic forces as offset.

Accordingly, the lines of magnetic force of one of the two centering magnets 1, 1 are offset by those of the other magnet as shown in FIG. 6 by superposing the magnets 1, 1, as positioned in opposite relationship in polarity, on each other at a relative angle of zero. Thus, no four-pole residual magnetic field will be set up by the combination of magnetic lines.

With a deflection yoke provided with two such centering magnets 1 in combination, the angle of the two magnets 1, 1 relative to each other can be adjusted to cause an adjusting magnetic force to act on an electron beam for the adjustment of centering. When there is not need for the adjustment of centering, the two centering magnets 1, 1 are positioned at a relative angle of zero, whereby the adjusting magnetic force can be eliminated completely.

Second Embodiment

Figure 7:
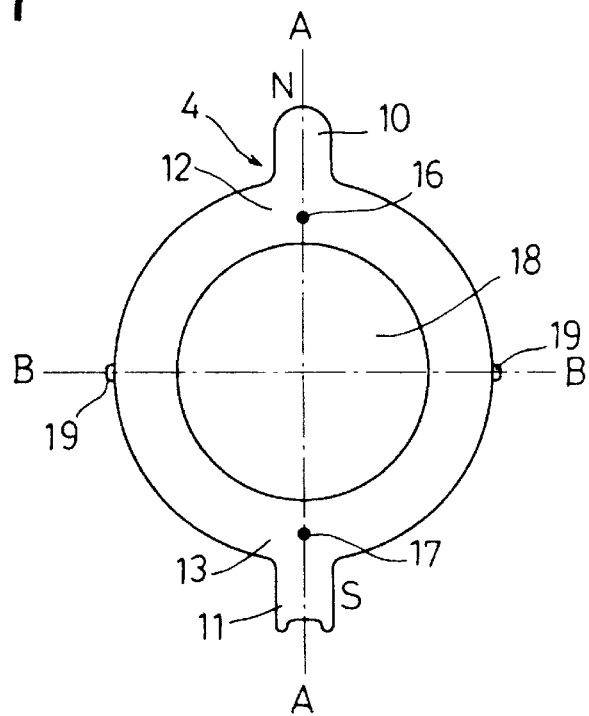
FIG. 7 is a plan view of a centering magnet as another example of construction of the invention.

Like the first embodiment, the centering magnet 4 of this embodiment shown in FIG. 7 is molded in an annular form from a nylon resin containing a finely divided alnico magnetic material. The magnet 4 has a pair of adjusting knob portions 10, 11 projecting therefrom at respective two positions displaced from each other by 180 degrees about the center axis of the annular form. One of the knob portions, 10, is magnetized to an N pole 12, and the other knob portion 11 to an S pole 13. A pair resin gate openings 19, 19 are formed respectively at two positions 90 degrees out of phase with the respective knob portions 10, 11. The second embodiment has the same contour as the first with the exception of these features.

Figure 8:
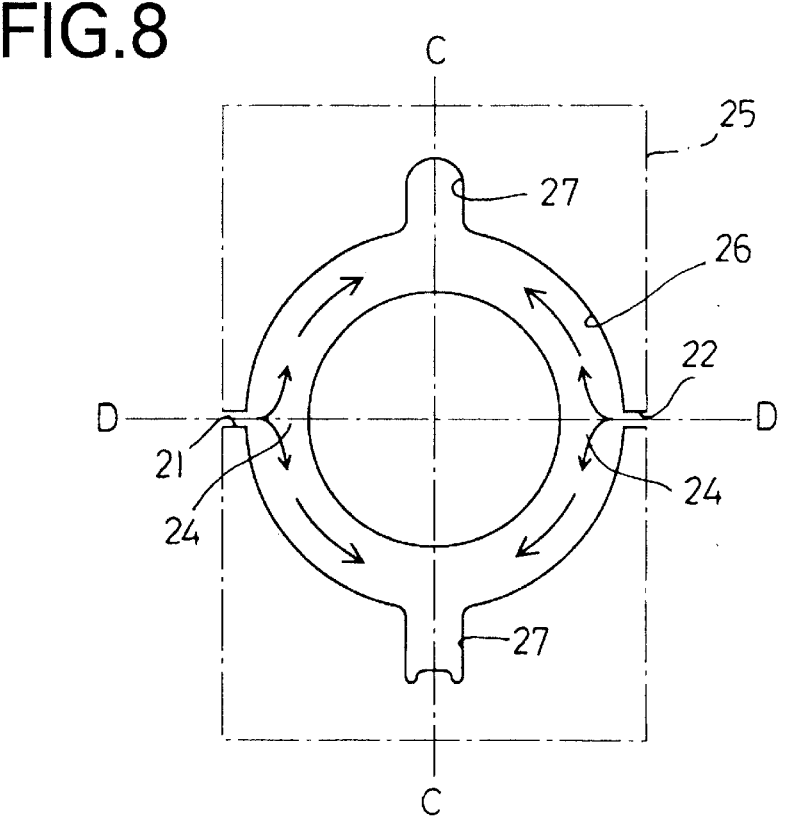
FIG. 8 is a plan view showing the shape of a hollow portion of a mold for use in molding the centering magnet.

To produce the centering magnet 4, a mold 25 is prepared first which has an annular hollow portion 26 shaped in conformity with the contour of the centering magnet as seen in FIG. 8. The hollow portion 26 of the mold 25 has a pair of cavities 27, 27 for forming the pair of adjusting knob portions, and resin gate openings 21, 22 formed respectively at two positions 90 degrees out of phase with the respective cavities 27, 27 for pouring the magnetic resin into the hollow portion 26 therethrough.

The resin poured in through the gate openings 21, 22 is divided on a line D—D as indicated by arrows in FIG. 8, forming four resin streams which are symmetric about a line C—C and about the line D—D. On each side of the line D—D, two resin streams meet on the line C—C, filling up the hollow portion 26 with the magnetic resin.

Figure 9:
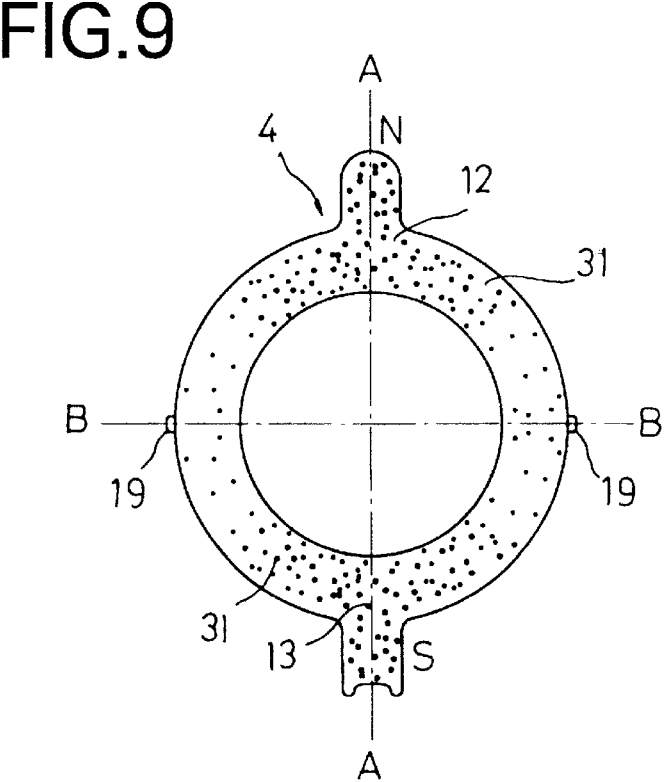
FIG. 9 is a plan view showing the distribution of a finely divided magnetic material incorporated into the centering magnet.
Figure 10:
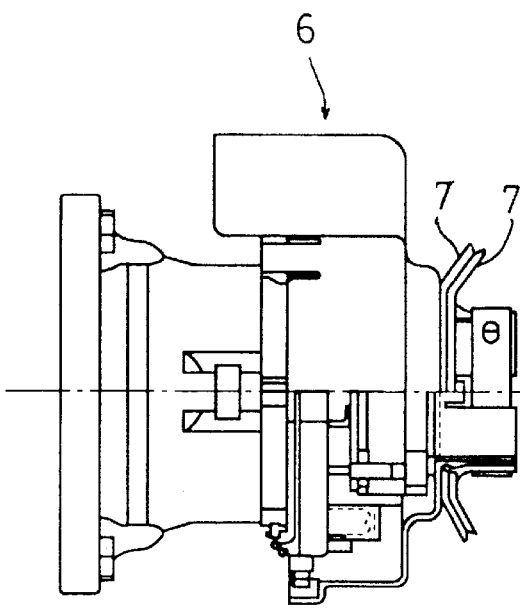
FIGS. 10(a) and 10(b) are a side elevation and a rear view, respectively, of a deflection yoke provided with centering magnets.
Figure 10:
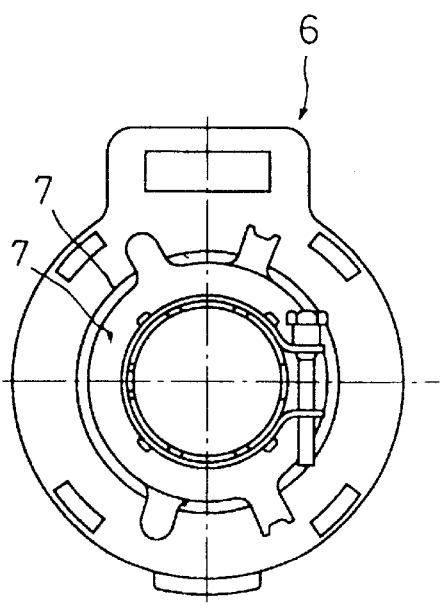
Figure 11:
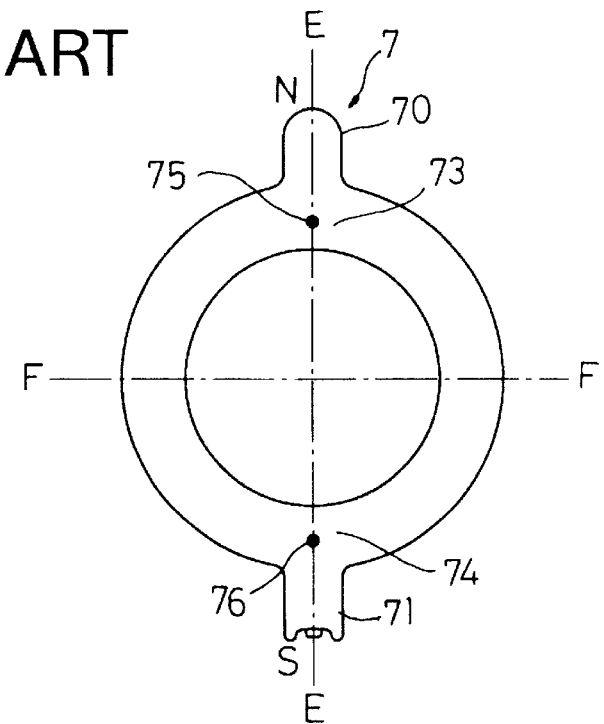
FIG. 11 is a plan view of a conventional centering magnet.
Figure 12:
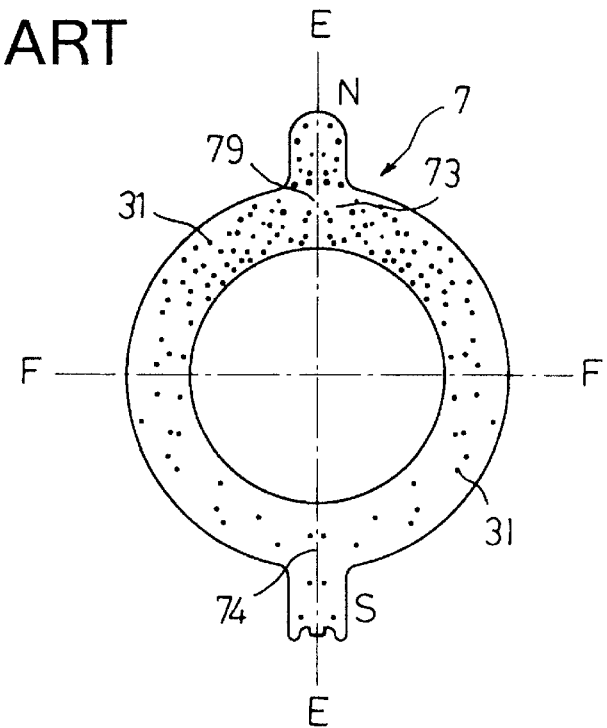
FIG. 12 is a plan view showing the distribution of a finely divided magnetic material incorporated into the centering magnet.
Figure 13:
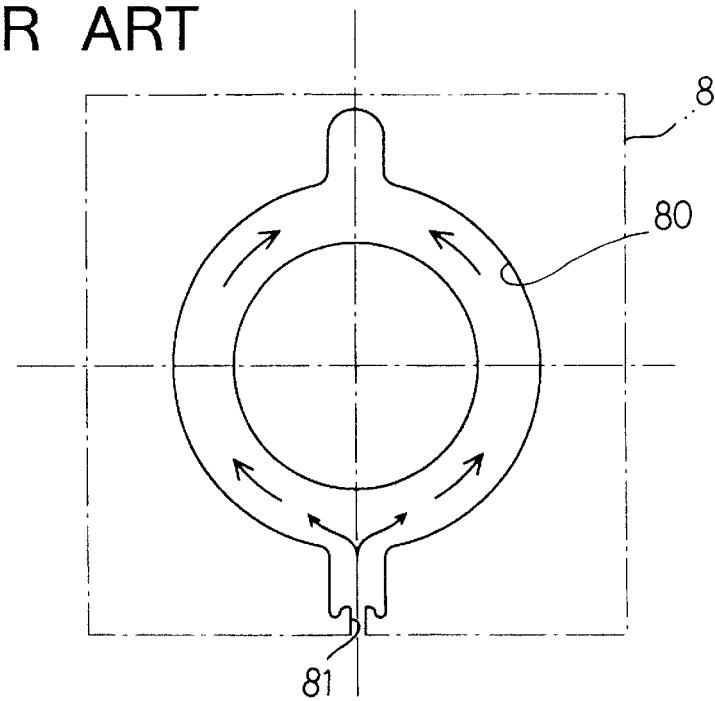
FIG. 13 is a plan view showing the shape of a hollow portion of a mold for use in molding the centering magnet.
Figure 14:
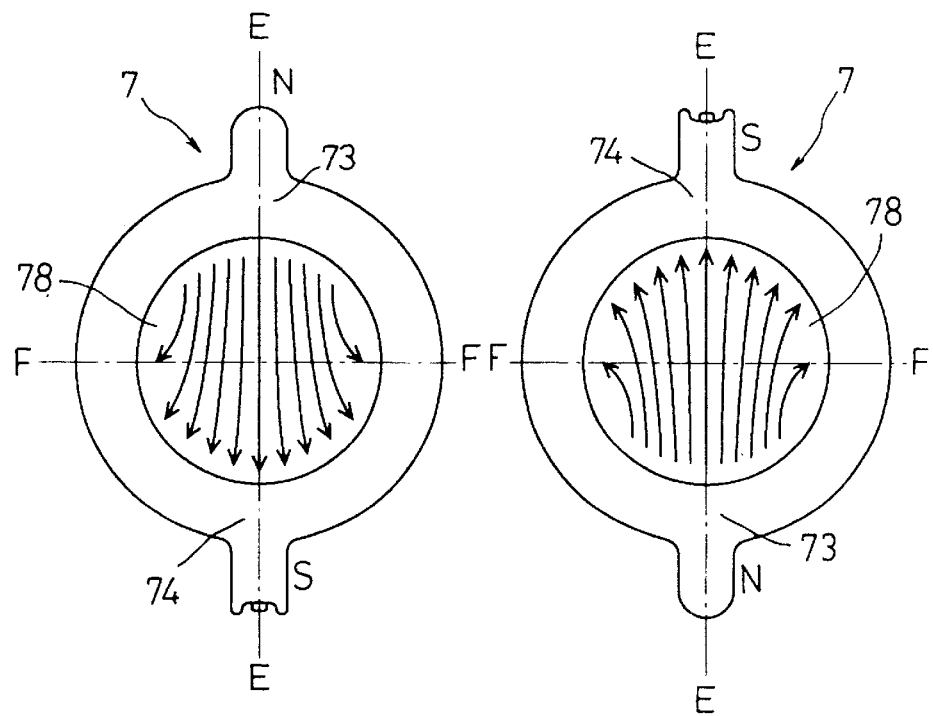
FIG. 14 is a plan view of two conventional centering magnets as arranged side by side to show the distribution of lines of magnetic force emanating from each magnet.
Figure 15:
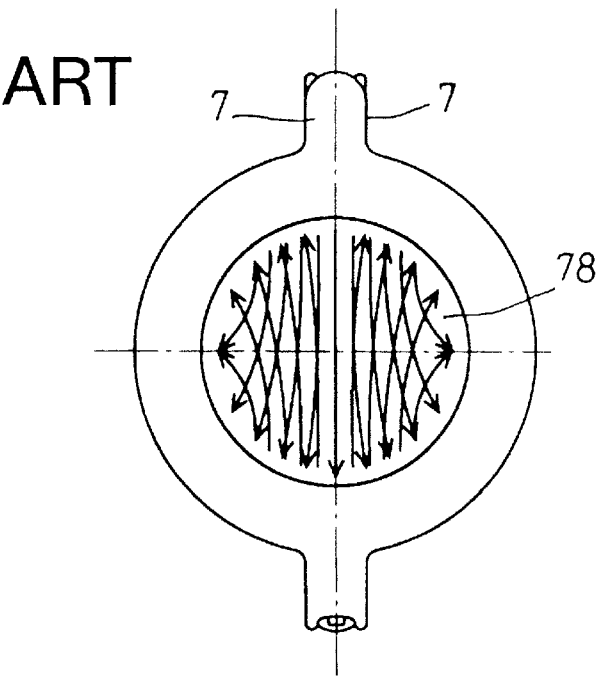
FIG. 15 is a plan view of the two centering magnets to show superposed lines of magnetic forces emanating therefrom.
Figure 16:
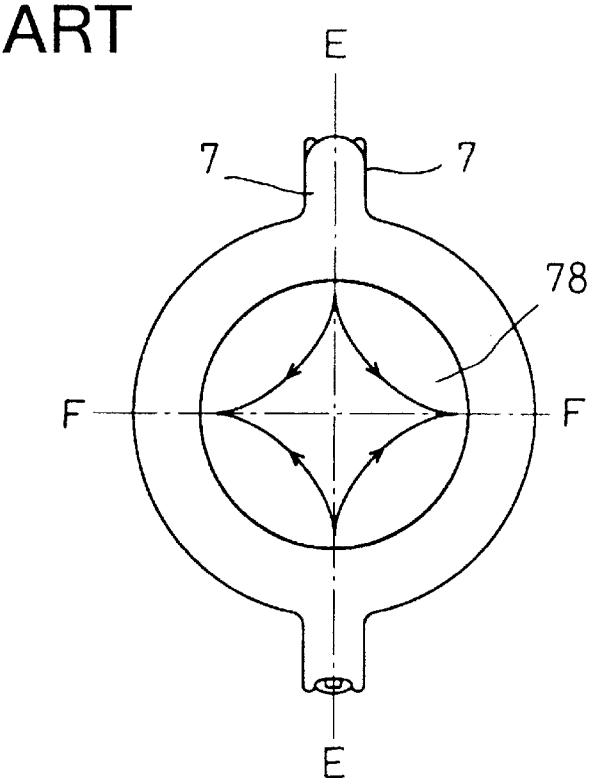
FIG. 16 is a plan view showing a four-pole residual magnetic field set up by the combined lines of magnetic forces of the two centering magnets.
Figure 17:
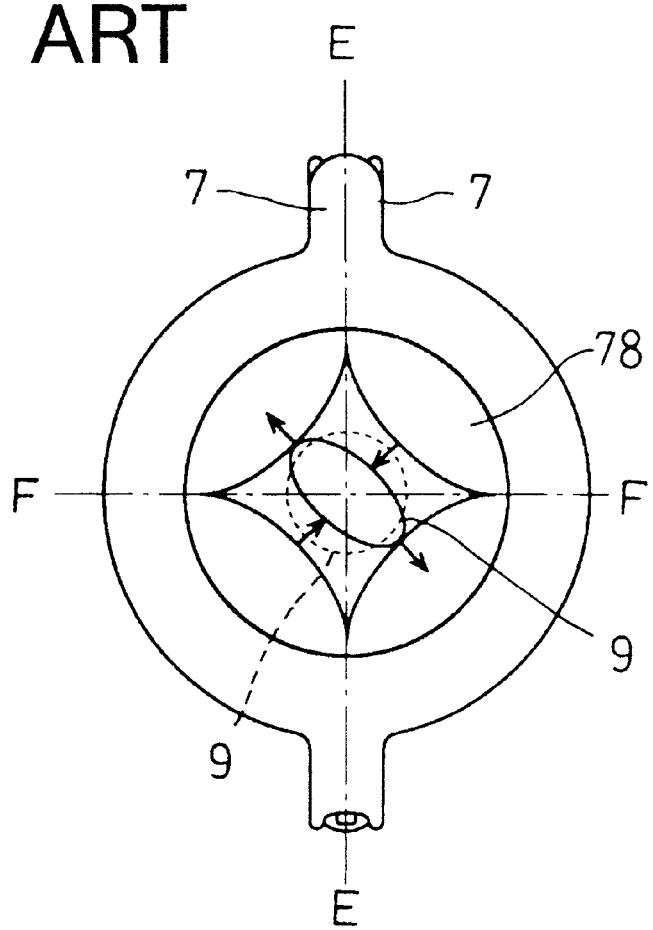
FIG. 17 is a diagram for illustrating deformation of an electron beam in a conventional deflection yoke.

The magnetic body thus obtained is smallest in the content of finely divided magnetic material at the position where the magnetic resin poured in through each of the resin gate openings 21, 22 of the mold 25 is divided, i.e., at each of the most upstream positions 24, 24 of the resin streams. The magnetic body is greatest in the content of magnetic material at each of the confluent positions. FIG. 9 shows the distribution of the finely divided magnetic material 31 in the magnetic body. As illustrated, the content of the finely divided magnetic material gradually varies from the two positions on a line A—A where the content is greatest toward the two positions on a line B—B where the content is smallest.

Subsequently in the step of molding step, the magnetic body is magnetized so that one adjusting knob portion 10 of the centering magnet 4 provides an N pole 12, with the other adjusting knob portion 11 forming an S pole 13 as shown in FIG. 7. Since the distribution of the finely divided magnetic material 31 is symmetrical about the line B—B orthogonal to the line A—A through the center point of the N pole 12 and the center point of the S pole as shown in FIG. 9, there is no likelihood that the N pole (12) side will be diffrent from the S pole (13) side in the mode of magnetization. Accordingly, the N pole (12) side is equal to the S pole (13) side in the density of lines of magnetic force emanating from the N pole 12 toward the S pole 13, and the distribution of magnetic lines is symmetrical about the line B—B.

When there is not need for the adjustment of centering in a deflection yoke provided with two such centering magnets 4 in combination, the angle of the two magnets 4, 4 relative to each other is set at zero, whereby the lines of magnetic force of one of the two centering magnets 4, 4 are offset. The adjusting magnetic force thus can be eliminated completely.

When the yoke provided with the two centering magnets of the invention need not be adjusted for centering, the adjusting magnetic force can be completely eliminated as stated above. This obviates the likelihood that the four-pole residual magnetic field that would otherwise be set up will magnetically deform the electron beam, consequently improving the performance of focusing images on the screen of the picture tube to achieve a high resolution.

The devices of the present invention are not limited to the foregoing embodiments in construction but can be modified variously by one skilled in the art without departing from the spirit of the invention as set forth in the appended claims. For example, with the two embodiments described, the pair of adjusting knob portions 10, 11 of the centering magnet 1 or 4 are in match with the respective N and S poles in position as seen in FIG. 1 or 7, whereas the pair of adjusting knob portions 10, 11 can be positioned as desired irrespective of the position of the N and S poles.

Further the number of resin gate openings in the mold for use in resin molding is not limited to two, but an even number of gate openings, which are at least four in number, can be positioned symmetrically about a diametrical line of the centering magnet, and two portions intersecting the diametrical line can be magnetized to an N pole and an S pole. This arrangement also has the same advantage as the foregoing embodiments.

What is claimed is:

1. A centering magnet mountable on a deflection yoke for the adjustment of centering and molded in an annular form from a resin material containing a finely divided magnetic material, the centering magnet having two portions opposed to each other as displaced from each other by 180 degrees about a center axis of the annular form thereof and magnetized to an N pole and an S pole respectively, the content of the magnetic material varying circumferentially of the annular form, the distribution of the content being symmetrical about a straight line orthogonal to a straight line through a center point of the N pole and a center point of the S pole.

2. A deflection yoke provided with a pair of centering magnets for the adjustment of centering, each of the centering magnets being molded in an annular form from a resin material containing a finely divided magnetic material, the centering magnet having two portions opposed to each other as displaced from each other by 180 degrees about a center axis of the annular form thereof and magnetized to an N pole and an S pole respectively, the content of the magnetic material varying circumferentially of the annular form, the distribution of the content being symmetrical about a straight line orthogonal to a straight line through a center point of the N pole and a center point of the S pole.

3. A centering magnet mountable on a deflection yoke for the adjustment of centering, the centering magnet being molded in an annular form from a resin material containing a finely divided magnetic material, with a plurality of positions arranged symmetrical about a diametrical line of the annular form and each serving as the most upstream position for a flow of the resin material for molding, the centering magnet being magnetized to an N pole and an S pole respectively at two portions intersecting the diametrical line or at two portions 90 degrees out of phase with said two portions respectively.

4. A centering magnet according to claim 3 wherein the finely divided magnetic material contains an alnico magnetic material.

5. A deflection yoke provided with a pair of centering magnets for the adjustment of centering, each of the centering magnets being molded in an annular form from a resin material containing a finely divided magnetic material, with a plurality of positions arranged symmetrical about a diametrical line of the annular form and each serving as the most upstream position for a flow of the resin material for molding, the centering magnet being magnetized to an N pole and an S pole respectively at two portions intersecting the diametrical line or at two portions 90 degrees out of phase with said two portions respectively.

6. A process for producing a centering magnet mountable on a deflection yoke for the adjustment of centering, the process having the resin molding step of molding an annular magnetic body from a resin material containing a resin powder, and the magnetizing step of magnetizing the magnetic body molded by said step, the resin molding step comprising preparing a mold having a plurality of resin gate openings in corresponding relation with a plurality of positions symmetrical about a diametrical line of the annular form of the magnetic body to be molded, and pouring the resin material containing a finely divided magnetic material into the mold through the resin gate openings, the magnetizing step comprising magnetizing the magnetic body molded by the resin molding step to an N pole and an S pole respectively at two portions thereof intersecting the diametrical line or at two portions thereof 90 degrees out of phase with said two portions respectively.

* * * * *